June 30, 1931.   F. G. BREYER   1,811,910
REDUCTION OF ZINCIFEROUS MATERIAL
Filed April 1, 1927   2 Sheets-Sheet 1

Fig. 1

INVENTOR
Frank G. Breyer
BY
Pennie, Davis, Marvin & Edmonds
ATTORNEYS

June 30, 1931.  F. G. BREYER  1,811,910
REDUCTION OF ZINCIFEROUS MATERIAL
Filed April 1, 1927  2 Sheets-Sheet 2

Fig. 2.

INVENTOR
Frank G. Breyer
By Pennie, Davis,
Marvin & Edmonds
ATTORNEYS

Patented June 30, 1931

1,811,910

UNITED STATES PATENT OFFICE

FRANK G. BREYER, OF PALMERTON, PENNSYLVANIA, ASSIGNOR TO THE NEW JERSEY ZINC COMPANY, OF NEW YORK, N. Y., A CORPORATION OF NEW JERSEY

REDUCTION OF ZINCIFEROUS MATERIAL

Application filed April 1, 1927. Serial No. 180,107.

This invention relates to the reduction or smelting of zinciferous materials and has for its object the provision of certain improvements in the reduction or smelting of such materials. More particularly the invention aims to provide certain improvements in the reduction of a porous charge of zinciferous and reducing materials, such for example as an agglomerated charge of mixed zinciferous and reducing materials. The present improvements are of special advantage in conjunction with the improved method of zinc smelting described and claimed in the copending application of Earl H. Bunce and myself, Serial No. 163,902, filed January 27, 1927 (which has since issued into United States Patent No. 1,712,132).

Zinc metal or spelter, when produced by the reduction of oxidized zinc ores at high temperatures, is almost universally made at the present time in zinc distillation or spelter furnaces having a number of relatively small retorts to the outer ends of which small condensers are attached. Each retort has but a single opening, which during the reducing operation is completely closed by the condenser and its luting. The zinc vapor and other gases evolved from the charge in the retorts pass in substantially horizontal lines from the retorts through their condensers, and the exhaust gases escape through the open end of the condensers.

Various suggestions and proposals have heretofore been advanced from time to time for overcoming the recognized defects of the present spelter furnaces with their numerous retorts of individual small capacity. Thus, vertical disposition of the small retorts has been proposed with the view of decreasing the charging and discharging labor by charging the retorts by gravity from an overhead crane and discharging by gravity by withdrawing a removable plug or other seal normally closing the lower end of the retorts. Continuous or progressive operations of various forms have also been proposed, such, for example, as the progressive passage by gravity of a loose charge through a vertical tube carefully sealed at its lower or residue discharge end by water, fines or similar sealing agencies.

In all prior proposals to smelt zinciferous materials in externally heated reducing chambers connected to condensers for the recovery of zinc metal, the reducing chamber has invariably been provided with positive sealing agencies for every outlet or opening in the chamber other than the gas outlet communicating with the condenser. The provision of such sealing agencies has been considered absolutely essential, because of the general belief that only in this way could all the zinc vapor be forced to flow into the condenser, on the one hand, and no air or other gas deleterious to zinc condensation be admitted into the reducing chamber and consequently into the condenser, on the other hand.

Considerable ingenuity has been exercised in the construction and maintenance of these sealing agencies, more particularly for the residue discharge outlet. The sealing of the charging opening presents no serious difficulty, since the relatively cold charge promptly becomes plugged with zinc oxide and condensed metal and thereby constitutes an excellent seal, and this zinc oxide and metal are not lost but are recovered when the charge subsequently progresses into the active reducing zone. At the residue discharge opening conditions are entirely different. The residues as discharged were usually sticky and slaggy and tended to adhere to the wall of the reducing chamber, necessitating frequent cleaning or scraping of the wall. Such operating conditions greatly complicate the problem of sealing the residue discharge outlet, and effective sealing was only attained with constant care and attention and at a high maintenance cost.

Recognizing the disadvantages of all types of mechanical sealing agencies, including liquid and fines seals at the residue discharge opening, due to their interference with the residue removing devices and the cost and maintenance of such seals in the heat, dirt and slag of the discharging residues, I primarily undertook to find other ways of effectively sealing the residue discharge and other openings in the reducing chamber. In so doing I have discovered that I can successfully induce the gases generated in a reducing chamber having a plurality of openings permitting gas ingress and egress to flow only to the condenser thereby dispensing with the necessity of mechanical sealing agencies at the other opening or openings as well as preventing loss of zinc at these openings. I have also discovered that I can by the same means prevent ingress into the reducing chamber of air or other gas in amounts undesirable from the standpoint of the subsequent condensation of zinc vapor to zinc metal. I have further discovered that by the same means I can induce a desirable ingress of air or other appropriate gas at an appropriate place in a suitably constructed reducing chamber.

I accomplish these results by disposing the opening or openings in the reducing chamber, which it is desired should be kept open and mechanically unhampered, for example, for the discharge of residues, at a substantially lower elevation than the outlet from the condenser for the zinc exhausted gases. By so disposing the outlet for the exhaust gases at a higher level than the openings in the reducing chamber, I set up a stack draft in the reducing chamber in the direction leading to the condenser. By appropriately controlling this stack draft and by then controlling the flow of gases induced by the stack draft, I can prevent the entrance of any air at the chamber openings, or I can induce air or other appropriate gas to enter the reducing chamber in regulated amounts and at such places as to be helpful to reduction and not harmful to the subsequent condensation of the zinc vapor to metal.

The intensity of the stack draft set up is dependent upon the height of the exhaust gas outlet of the condenser above the residue discharge or other unsealed opening in the reducing chamber, and also upon the temperatures prevailing in the reducing chamber, the condenser, and intermediaries, if any. The absolute and differential gas pressures realized in operation and the amount of gas that these differential pressures will move will depend upon the sum of the various resistances to gas flow in the system. Most of these resistances are determined and fixed by the size and shape of the reducing chamber, the condenser, and intermediaries if any, and by the porosity of the charge in the direction of gas flow. The final exhaust gas outlet from the condenser is, however, a suitable and convenient place for providing control and regulation of the gas pressures in the system. An adjustable resistance to gas flow, such for example as a valved outlet, can here be conveniently provided, and, if desired, adjustment may also be made of the ultimate height of the exhaust gas outlet. By appropriate adjustment and regulation of the exhaust gas outlet of the condenser, I am able to so control the pressures throughout the system as to establish no gas ingress or egress through the openings in the reducing chamber, or to establish the ingress into the chamber of a desirable and helpful quantity of air or other appropriate gas.

The present invention accordingly involves reducing or smelting a porous charge of zinciferous and reducing materials and recovering zinc metal in an externally heated reducing chamber operatively connected with a condenser and having in addition to its communication with the condenser one or more openings permitting gas ingress and egress and is characterized by inducing the flow of evolved gases into the condenser by controlled stack draft. The stack draft is provided by disposing the escape for the exhaust gases from the condenser at a substantially higher level than the opening or openings in the reducing chamber (other than the opening communicating with the condenser). The control of the stack draft is effected first or roughly by varying the difference in level between the condenser itself and the opening or openings permitting gas ingress and egress, but may be more closely and nicely controlled, if desired or necessary, by varying the final height of the gas outlet pipe or stack exiting the exhaust gases from the condenser. The invention further involves controlling the flow of gases, induced by the controlled stack draft, by varying the resistance to the flow of these gases through the passage constituting the stack and occasioning the stack draft so that the actual differential pressure indications with respect to the outside atmosphere may be held at predetermined values at one or more points in the system. Preferably, the desired predetermined differential pressure indications are established and maintained by adjustment and regulation of the resistance to gas flow from the final exhaust gas outlet from the condenser. By such control of the stack draft and by such control of the gas flow induced by the stack draft, I may either substantially inhibit the ingress and egress of gas through the chamber opening or openings (other than its communication with the condenser), or I may permit the regulated ingress through such opening or openings into the chamber of air or other appropriate gas.

In practicing the invention, I prefer to make use of a stack draft resulting from a difference in elevation of 25 feet or more. On the other hand, I have in practice found it possible to work with stack drafts resulting from a difference in elevation as low as 8 feet, but I find that the gas flow induced by the relatively small stack draft resulting from such low differences in elevation are difficult to control under normal operating conditions. I also prefer to have the charge undergoing reduction so porous to the flow of the evolved gases and the resistance to gas flow through the condenser itself and the connecting and intermediary devices so low that the desired control of the gas pressures in the system can be established and maintained by any simple outlet restrictive device, such as a damper, butterfly valve or gate-valve, in a pipe line leading from the condenser to the atmosphere or other discharge region for the exhaust gases. It is further my preferred practice to provide appropriate sealing agencies for the charging opening of the reducing chamber, since little, or no, difficulty is encountered in the maintenance of such agencies more particularly with vertically disposed reducing chambers. The residue discharge openings I leave open or unsealed, except insofar as it may be closed by the dry discharging residue, thereby normally permitting ingress and egress of gas through this opening, and I then appropriately control and regulate the gas ingress or egress through this opening by controlling and regulating the gas flow induced by the controlled stack draft. When operating to produce high grade zinc metal, low in lead, I find it advantageous to permit the ingress into the reducing chamber of regulated amounts of reducing gases such as hydrogen, carbon monoxide, gases arising from heating fuel oil, and the like. On the other hand, when the lead content of the condensed zinc metal is not of such importance, as for example in the production of Prime Western brand of zinc metal, the ingress of a controlled amount of air into the reducing chamber through the residue discharge opening is in some cases of advantage.

In the accompanying drawings, I have illustrated two types of apparatus particularly adapted for practicing the invention. The novel features of the invention and the application of these features to commercial zinc-smelting operations will now be better understood from the following description of the invention as practiced in the apparatus illustrated. In the accompanying drawings

Figure 1:
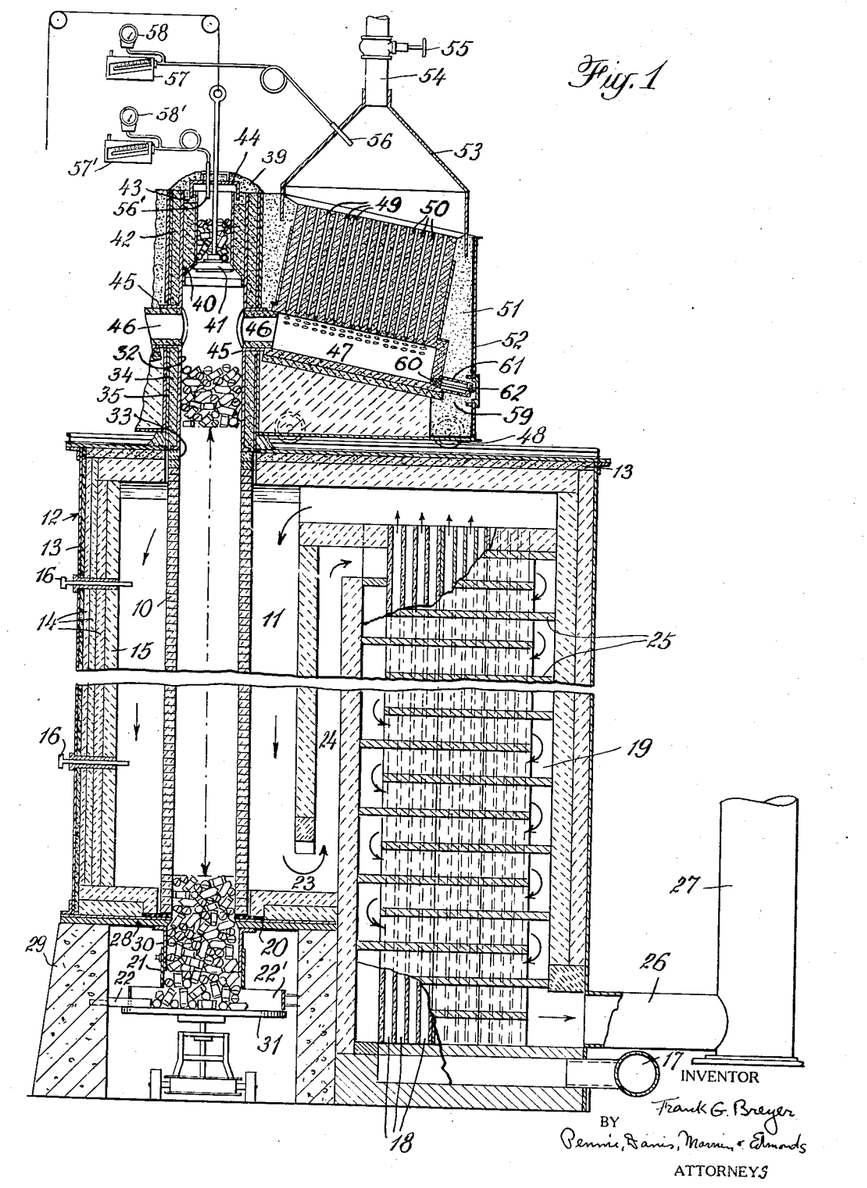
Fig. 1 is a sectional elevation of a vertical retort furnace and Fig. 2 is a longitudinal sectional elevation of a horizontal travelling hearth furnace.

The vertical retort furnace illustrated in Fig. 1 of the drawings comprises a vertically disposed cylindrical retort 10 built up of circle brick in the manner described in the copending patent application of Earl H. Bunce and myself, filed March 5, 1927, Ser. No. 172,950 (which has since issued into United States Patent No. 1,680,726). The built-up retort 10 is supported exclusively at the base and is at no other place throughout its length attached to or otherwise tied into the heating chamber or furnace structure. The retort is surrounded by a heating chamber or laboratory 11 built within a furnace structure comprising an outer steel shell or casing 12, a layer of heat insulating material such as sil-o-cel powder 13, an intermediate lining 14 of one or more layers of fire brick or other appropriate material and an inner lining 15 of heat-refractory or temperature resistant material such, for example, as carbofrax brick. Appropriate openings are provided through the wall of the furnace structure permitting the insertion of pyrometers 16 within the heating chamber 11 for ascertaining and appropriately controlling the temperature throughout the length of this chamber.

The furnace illustrated in Fig. 1 is heated by the hot products of combustion from burning gas, although it is to be understood that any appropriate means may be employed for heating the reducing chamber or retort 10. The fuel gas is supplied from a gas main 17 to a plurality of vertical passages or conduits 18 arranged within a recuperator 19 built within the furnace structure alongside of the heating chamber 11. Similarly, air is supplied to a plurality of passages or conduits in the recuperator but not shown in Fig. 1 of the drawings since these passages or conduits would be back of or behind the passages or conduits 18 as viewed in this figure. It will be understood, of course, that the lining of the recuperator may be built of less temperature-resistant material than the lining of the heating chamber 11, and that the recuperator will be provided with appropriate clean-out openings for the various gas passages thereof.

From the top of the recuperator the preheated fuel gas and air are delivered from their respective passages to appropriate adjacent ports (not specifically shown) near the top of the heating chamber 11. The resulting hot products of combustion pass downwardly around the retort 10 to an outlet 23 near the bottom of the heating chamber 11, and thence upwardly through a vertical flue 24 to the top of the recuperator. The recuperator is provided with staggered horizontal baffles 25 which cause the heating gases to follow a zig-zag path in their flow through the recuperator to the gas outlet 26 and stack 27.

The furnace structure of the heating chamber 11 is mounted on a metal base plate 28 supported on an appropriate foundation 29 of concrete or the like. The retort 10 is built up on and supported by the base-plate 28, with a layer of heat-insulating material 20 disposed between the base-plate and the bottom course of brick of the retort. The base-plate 28 has a central opening directly beneath and of approximately the same dimensions as the interior cross-section of the retort. A metal cylinder 30 is bolted, or otherwise appropriately secured, to the underside of the base plate 28 and serves as an extension of the retort 10 below the base plate. A vertically adjustable sleeve 21, of sheet metal or the like, is attached to the cylinder 30. A rotatable table 31 is movably mounted directly beneath and appropriately spaced from the bottom of the sleeve 21 and serves to support the charge in the retort 10 and, by its rotation in conjunction with a stationary plow or scraper 22, permits the discharge of spent residues from the bottom of the retort as desired. A stationary apron 22' is mounted immediately above the outer periphery of the table 31, and serves to hold the discharging residues on the table, except where these residues are swept from the rotating table by the stationary scraper 22. From the rotating table 31 the spent residues are delivered to a conveyor or other appropriate means of removal not shown in the drawings.

The upper end of the retort 10 extends freely through the top of the furnace structure. A cylindrical metal casting 32, preferably a nickel-chromium-iron alloy such as Hybnickel, rests on top of the retort. Several rings of ordinary fire brick 33 are preferably interposed between the top carbofrax ring of the retort and the cylinder 32, in order to keep the carbofrax brick from contact with the metal. The cylinder 32 is surrounded by a layer of hardened carbon paste 34 incased by a sheet metal cylinder 35, which in turn may be surrounded by a mass of dust coal where not otherwise adequately insulated by the adjacent condenser structures. The metal cylinder 32 with its surrounding layer of hardened carbon paste 34 thus rests on top of the retort 10 and is free to move therewith. A mass of dust coal about the lower end of the cylinder 32 will generally be desirable to provide a mobile seal between the retort and the opening in the top of the furnace structure through which the retort extends.

The top of the cylinder 32 is provided with a charging device comprising an inverted sheet metal funnel 40 appropriately mounted within the cylinder 32 and a cooperating movable plug or bell 41. The space between the funnel 40 and the cylinder 32 is filled with hardened carbon paste 42 and an overlying mass of dust coal 43, in which the rim or edge of a cover 44 is embedded.

The metal cylinder 32 has a pair of lateral gas offtakes 45 lined with graphite tubes 46 and leading to condensers. Only one condenser has been illustrated in Fig. 1, but it is to be understood that the other condenser is of the same type and construction as the one that is shown in the drawings. Where the gas offtake of the retort 10 operatively enters or abuts on the condenser or any other appurtenance, which is relatively fixed with respect to the expanding or contracting movements of the retort, it is important that the connection be adjustable to permit such relative movements. In the furnace shown in Fig. 1, the equivalent result is obtained by making and breaking the connection between the gas offtakes and the condensers after the retort is up to heat and before it is cooled down, respectively.

The condenser illustrated in Fig. 1 of the drawings is of the multi-channelled type described in my copending patent application, Serial No. 167,135, filed February 10, 1927. The condenser comprises a gas distributing and molten metal collecting chamber 47 having a gas inlet in communication with the gas outlet 46 from the retort 10. The chamber 47 is formed in a solid block of graphite of hollow cylindrical configuration slightly inclined from its inner end towards its outer end. A multi-tubular condensing tower is mounted on top of the chamber 47 with its multiplicity of upright tubes or channels 49 in communication with the chamber. The tubes 49 are carbon tubes of about one to three inches internal diameter, having their lower ends seated in appropriate recesses in the top of the graphite block of the chamber 47. The spaces between the tubes 49 are filled with hardened carbon paste 50. The tower and graphite block (forming the chamber 47) are surrounded by a mass of dust coal 51 appropriately confined by a metal casing 52. The entire condenser structure is mounted on wheels or trucks 48 running on tracks supported on top of the furnace structure. The condensers are thus conveniently moved into and away from their operative positions with respect to the gas outlets 46.

A sheet metal hood 53 covers the tops or gas exit ends of all the channels 49 in the tower. The lower edge or rim of the hood 53 is embedded to a desired extent in the surrounding dust coal 51. The hood has a top opening in which a vertically disposed exhaust pipe 54 is operatively inserted. The pipe 54 has a gate or other appropriate valve 55. A pressure responsive device 56 is inserted within the hood 53 and is operatively connected to a pressure gauge 57 and a pressure recording instrument 58. The chamber 47 is provided near its bottom and at the longitudinal end opposite its gas inlet with a taphole 59 through which molten zinc metal may be withdrawn from the chamber from time to time. The taphole 59 is normally closed by an inner graphite plug 60 secured to a manipulating rod 61 and an outer plug 62 of fine clay or the like.

In practicing my present invention in the apparatus of Fig. 1, I preferably conduct the operations in accordance with the principles described in the copending patent application of Earl H. Bunce and myself, Serial No. 163,902, filed January 27, 1927 (which has since issued into United States Patent No. 1,712,132). Thus, a mixed charge of zinciferous and carbonaceous materials is agglomerated and progressively passed through the retort 10. The agglomeration of the mixed charge, including the size, shape, strength and manner of making the agglomerates, as well as the progression of the agglomerates through the retort are conducted with the view of securing the optimum conditions for the rapid transfer of heat throughout the agglomerated charge by currents of hot gases. The agglomerated charge passes through the retort without substantial breaking down of the agglomerates, and worked-off residues are discharged from the bottom of the retort as required for the charging thereto of fresh agglomerates; the discharged residues being in a dry condition and for the most part in the form of agglomerates.

From time to time as required, fresh agglomerates are charged into the top of the retort 10. In charging fresh agglomerates, the cover 44 is raised and the neck of the charging funnel 40 filled with agglomerates. The cover is then lowered to close the top of the funnel 40 and the plug 41 lowered permitting the agglomerates to drop into the retort. The plug 41 is then raised and the sequence of operations repeated until the desired amount of charge has been introduced into the retort. The charging operations are thus conducted with a minimum loss of zinc-carrying gases.

The primary sealing of the charging end of the retort is effected by the plug 41 seating in the flared portion of the funnel 40, and the final seal is effected by the cover 44 with its rim embedded in the dust coal 39 and its top layer of dust coal 63. The metal-laden gases from the retort 10 flow through the gas outlets 46 into the multi-channelled condensers where appropriate temperature and pressure conditions are maintained for good metal condensation in accordance with the principles described in my aforementioned application, Serial No. 167,135.

In accordance with the characteristic features of my present invention, the bottom of the retort 10 is unsealed and open except to the extent that the dry and agglomerated discharging residues partially fill the open bottom of the retort. Accordingly, free ingress and egress of gas through the voids in the discharging residues is possible. By the principles of the present invention such ingress or egress of gas is regulated and controlled by, first, regulating and controlling the stack draft and, second, by regulating and controlling the flow of gas induced through the apparatus by the stack draft.

The following specific example will further illustrate the principles of the invention as practiced in the apparatus of Fig. 1, although it is to be understood that this example is merely illustrative and in no sense restrictive of the invention.

The retort 10 was 40 feet high and 2 feet internal diameter with a wall thickness of 4½ inches. The graphite tubes 46 were 10 inches inside diameter. The final operative connection of these tubes to their respective condensers was made after the retort was up to heat and had therefore established a substantially permanent elevation of the gas off-takes above the top of the furnace structure. Final adjustment of the height of the condensers is made by adjusting jacks, wedges, or the like. Whenever the retort is to be cooled down, the connections between the gas off-takes and the condensers are broken so that unhampered contraction of the retort may take place.

The charge was made up of approximately 60 parts by weight of finely divided zinc silicate ore (containing from 45–50% of zinc) and 40 parts by weight of a caking coal (containing about 18% volatile matter) and 3% of waste sulfite liquor (containing about 50% solids). Approximately 80% of the zinc ore passed through a 20 mesh screen. The caking coal (Consolidation Georges Creek Big Vein) was pulverized so that approximately 80% passed through a 20 mesh screen. The zinc ore and coal were placed in a revolving mixer of the kind employed for the mixing of concrete and thoroughly mixed. From the revolving mixer, the material was dumped directly into a dry pan Chilean mill and subjected to the mixing and comminuting action of the mill for some minutes. From the Chilean mill, the material was taken to a briquetting press and formed into briquettes by a compressive force of approximately 2000 pounds to the square inch. The briquettes were approximately cylindrical in configuration, being about 6 inches long and about 2¾ inches in diameter with their longitudinal ends beveled to a stubby wedge or chisel shape.

The briquettes, without drying, were charged into an externally heated vertical caking retort. In this retort, the briquettes were subjected to a caking temperature of about 700° C. In the caking operation, it is desirable to leave behind in the caked agglomerates as high a percentage as possible of the non-condensible volatile substances, and at the same time eliminate as completely as possible the tars. As a result of the caking action, the intimately mixed particles of ore and coal are firmly held together by the binding action of the cake formed in the caking operation.

The caked agglomerates were transferred without substantial loss of heat from the caking retort to the vertical smelting retort 10, and introduced therein at the rate of approximately 625 pounds at intervals of one-half hour. The heating of the retort was controlled so as to maintain a temperature of about 1300 to 1400° C. at the upper end and about 1200° C. at the lower end, and no slag was formed and no fusion of the agglomerates took place.

The gaseous products of the reaction for the most part zinc vapor and carbon monoxide gas with from 0.2 to 0.8% of carbon dioxide pass through the condensers where the zinc vapor is condensed, collected and periodically withdrawn as zinc metal. Although the charging of the furnace was intermittent (every one-half hour), its operation as a whole was continuous, the retort 10 being at all times filled with an agglomerated charge undergoing reduction.

Spent residues were withdrawn from the bottom of the retort preceding each charging operation in such amount as required for the subsequent charging of approximately 625 pounds of fresh agglomerates. For the most part, these residues as discharged retained their original briquetted form and were free and non-adherent (what the zinc metallurgist would call a dry residue). The amount of zinc in these residues average about 2%, thus representing an elimination or extraction of about 95% of the total zinc in the original ore. Of the zinc eliminated or extracted from the ore, 96% was condensed and collected as slab-zinc metal, the remaining 4% being for the most part recoverable as zinc oxide and blue powder.

Considering now more particularly the novel principles of the present invention, it will be noted that the interior of the vertical retort 10, the gas off-take pipe 46, the distributing chamber 47 and upright channels 49 of the condenser, the hood 53, and the exhaust pipe 54 are connected together so that gas may flow therethrough as in a continuous passage. This passage, insofar as it is vertical, when it gets up to working temperatures constitutes a stack or chimney of somewhat tortuous path, and gives rise to a "stack draft" which may be expressed in inches of water and the intensity of which is determined by the vertical height of the passage. Applying the principles of the present invention, I have established, in the apparatus and operation I am now discussing, a maximum available stack draft of between 0.5 and 0.6 inches of water by having the final exhaust gas outlet from the condenser approximately 50 feet above the residue discharge opening at the bottom of the retort 10 where gas ingress and egress is possible. This stack draft is more than ample, considering the porosity of the charge to gas flow and the relatively free gas passages to and through the condenser, to induce the flow of all the gases evolved in the retort into the condensers.

Unless some restriction, such for example as adjustment of the valve 55 in the exhaust pipe 54, is applied to the gas flow induced by this stack draft, air will be sucked in at the residue discharge end of the retort 10 until the quantity of gases passing through the apparatus is so great that the resistance to this relatively large gas flow is equal to the entire stack draft inducing the flow. By appropriate adjustment of the valve 55 the amount of air, or other appropriate gas, sucked in at the residue discharge end of the retort may be limited and regulated or substantially inhibited.

The control of the gas flow, induced by the stack draft, through the medium of the valve 55 is, in practice, conveniently accomplished by establishing and maintaining a predetermined gas pressure within the hood 53. The operator on top of the furnace is instructed as to the gas pressures to be so established and maintained, and he secures the desired results by appropriate manipulation of the valve 55. After a fresh charge has been introduced into the retort 10, the valve 55 will be opened wider in order to permit the escape of the relatively large amount of gas evolved during this period. As the volume of evolved gas decreases, the valve 55 is gradually turned so as to provide a gradually increasing resistance to the flow of the exhaust gases through the pipe 54. By such manipulation of the valve 55, the operator maintains a constant predetermined pressure within the hood 53, and thereby establishes and maintains the desired conditions of gas ingress or egress through the open or unsealed bottom of the retort 10. For the most part, the operator relies upon the pressure indications of the gauge 57 in effecting the desired manipulative control of the operations. I prefer to also provide a pressure responsive device 56', in the top of the funnel 40, operatively connected to a pressure gauge 57' and a pressure recording instrument 58'. Comparison of the pressures within the funnel 40 and hood 53 then serve to indicate any stoppage or other faults in the flow of the evolved gases through the system.

Where high grade zinc metal is to be produced, I prefer to permit ingress of reducing gases such as hydrogen, carbon monoxide, fuel oil gas or the like. In practice this may be conveniently accomplished by inserting the end of a pipe in the residues discharging from the bottom of the retort 10 and supplying to this pipe, under appropriate pressure, a small flow of fuel oil. The fuel oil is vaporized and sucked into the retort in controlled amounts by appropriately controlling the flow of gases induced by the stack draft, as, for example, by appropriate manipulation of the valve 55. I prefer to produce a slightly greater amount of the vaporized fuel oil than can be sucked into the bottom of the retort and to permit the excess of the vaporized fuel oil to burn beneath or around the lower extension of the retort thereby giving a visible indication that no air is entering the retort through the residue discharge opening.

The ingress of air into the retort through the residue discharge opening effects certain advantageous results in the reducing operation, but also increases the quantity of lead that is volatilized from lead compounds in the charge. It is on this account that I inhibit the ingress of air and preferably permit the ingress of reducing gases when producing high grade zinc metal as free from lead as possible. On the other hand, where the lead content of the zinc metal produced need not be kept as low as possible, I prefer to permit a controlled ingress of air into the retort through the residue discharge opening with its attendant advantages in the reducing operation.

Figure 2:
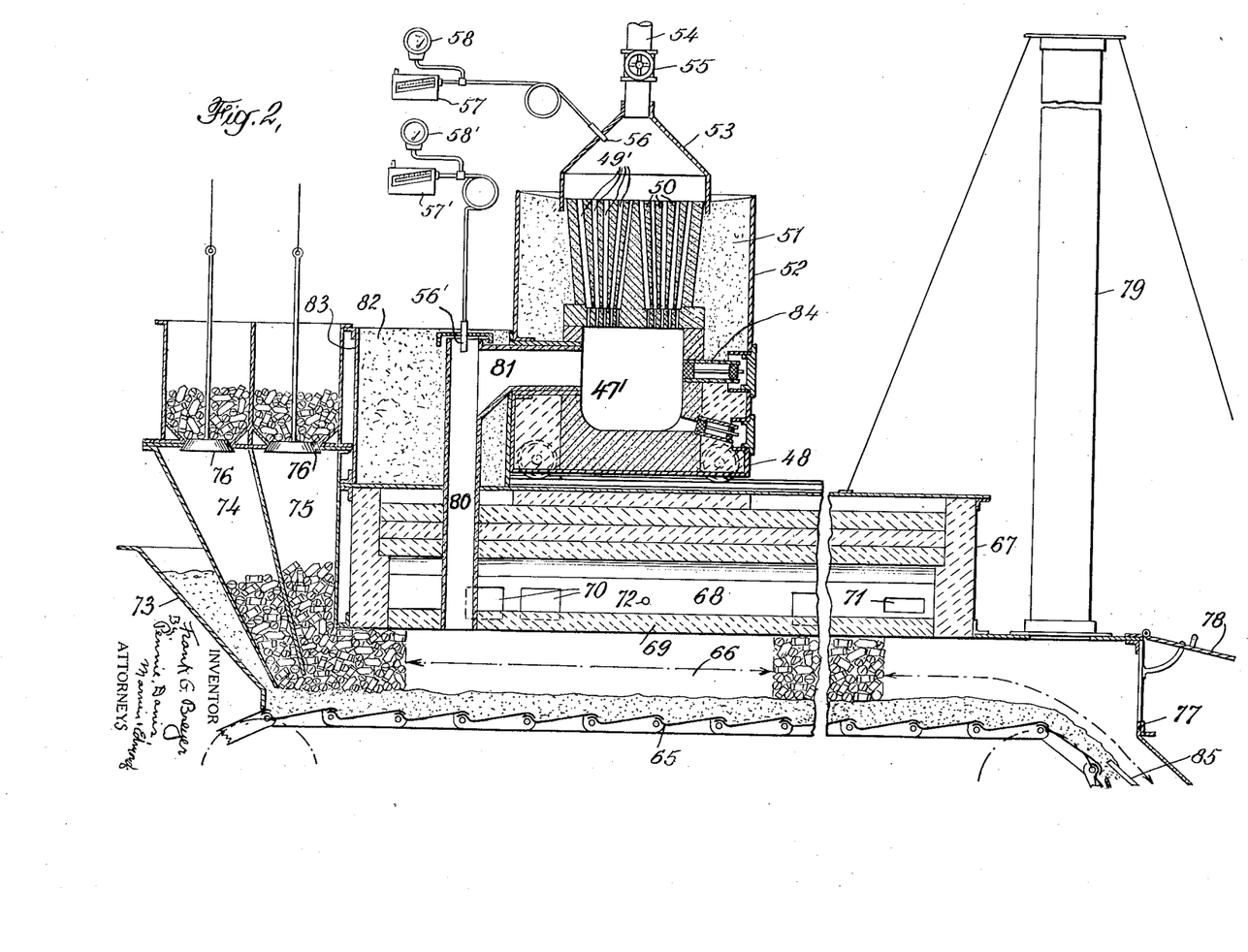

The apparatus illustrated in Fig. 2 of the drawings comprises a traveling hearth 65, of the pan conveyor type, constituting the bottom of a relatively long reducing chamber 66 of rectangular section. The reducing chamber is embodied in an appropriate furnace structure 67 having a heating flue 68 overlying the roof or arch 69 of the reducing chamber.

Ports 70, for heated fuel gas and air, extend through the side walls of the furnace structure into the flue 68, and the hot products of combustion resulting from the burning of the gas mixture delivered through these ports, flow through the flue to a gas outlet 71 communicating with a recuperator. Pyrometers 72 are inserted at appropriate points in the flue 68 for determining and controlling the temperature of the heating gases passing therethrough.

At the charging end of the furnace a fines hopper 73, a spent agglomerate hopper 74 and a fresh agglomerate hopper 75 are arranged side by side, the agglomerate hoppers 74 and 75 being provided with mechanical sealing bells 76. The residue discharge end of the furnace is substantially enclosed by a casing 77, provided with an end door 78, normally open through which the discharge end of the moving hearth may be conveniently examined. Dust from the discharging residues is for the most part drawn into a stack 79.

A gas outlet 80 communicates with the top of the reducing chamber 66 near the charging end thereof. The outlet 80 extends across substantially the entire width of the reducing chamber and projecting upwardly through the flue 68 and the overlying layers of heat refractory material terminates in two gas off-takes 81 operatively connected to condensers. Above the furnace structure, the outlet 80 is surrounded by a mass of dust coal 82 appropriately confined by the condenser structures and a sheet metal wall 83. A pressure-responsive device 56' is inserted in the top of the outlet 80 and is operatively connected to a pressure gauge 57' and a pressure recording instrument 58', as in the apparatus of Fig. 1.

Only one of the two condensers operatively connected with the gas outlet 80 is shown in Fig. 2 of the drawings. These two condensers are substantially identical, and are of the same general type shown in Fig. 1 of the drawings, and accordingly the same reference characters are used to indicate corresponding or equivalent elements. The furnace illustrated in Fig. 2 is further provided with two additional condensers not shown, since these condensers appear in that part of the furnace included between the broken lines.

The gas distributing and molten metal collecting chamber 47' of the condensers of Fig. 2 is substantially circular in horizontal section and is formed in a solid block of carbon. Similarly, the multi-tubular condensing tower is substantially circular in horizontal section and the upright channels 49' thereof are arranged in more or less concentric circles. Each condenser has a clean-out opening 84, normally sealed, substantially opposite its gas off-take 81.

In practicing the present invention in the apparatus of Fig. 2, I preferably conduct the operations in accordance with the principle described in the copending patent application of Earl H. Bunce and myself, Ser. No. 163,902, filed January 27, 1927 (which has since issued into United States Patent No. 1,712,132). Thus, the pan conveyors as they enter the reducing chamber traveling in the direction indicated by the arrows are covered with an appropriate layer of fine material delivered onto the pans from the hopper 73. Worked-off or spent agglomerates are delivered onto the bed of fines from the hopper 74 and become partially embedded in the fines and to this extent prevent the embedding of the agglomerates undergoing reduction. The agglomeration of the mixed charge, including the size, shape, strength and manner of making the agglomerates, as well as the progression of the agglomerates through the reducing chamber are conducted with the view of securing the optimum conditions for the rapid transfer of heat throughout the agglomerated charge by currents of hot gases The agglomerated charge is delivered from the hopper 75 onto the layer (approximately one agglomerate deep) of spent agglomerates. The layer of spent agglomerates interposed between the bed of fines and the overlying layer of agglomerates undergoing reduction insures the desired porosity of the entire bed of these latter agglomerates, and, consequently, the efficient transfer of heat by currents of hot gases throughout the bed of these agglomerates. The spent residues and fines are discharged from the pan conveyor onto a grizzly 85 through which the fines pass while the agglomerates slide down the grizzly and are appropriately disposed of. The fine material passing through the grizzly is conveyed back to the fines hopper 73 in such amount as required, and an appropriate amount of the spent or worked-off agglomerates is conveyed back to the hopper 74.

The reducing chamber of the furnace illustrated in Fig. 2 is approximately 12 feet wide and 60 feet long. The heating of the reducing chamber is controlled by maintaining a temperature of about 1300 to 1400° C. in the heating flue 68 approximate the charging end of the furnace and a temperature of about 1200° C. in this flue approximate the discharging end of the furnace. The bed of fines is approximately 6 to 9 inches deep and the agglomerated charge near the center of the arch is approximately 15 to 18 inches deep. The agglomerated charge may be of the same composition and character as described in connection with the operation of the furnace of Fig. 1. Approximately 30 tons of agglomerates will be charged to the furnace of Fig. 2 per 24 hours. The agglomerated charge substantially fills the reducing chamber above the bed of fines and interposed layer of spent agglomerates and is progressively advanced through the chamber by the movement of the pan conveyor. The mixture of metallic zinc vapor and carbon monoxide gas (resulting from the reduction of the zinciferous material in the agglomerated charge) passes from the reducing chamber through the gas outlet 80 and offtakes 81 into the multi-channeled condensers where substantially all of the zinc vapor is condensed to molten zinc metal. From time to time, molten zinc metal is withdrawn from the condensers through their tap holes.

In accordance with the principles of my present invention, the discharge end of the reducing chamber is unsealed and open, except to the extent that it is filled with the discharging bed of fines and worked-off agglomerates. Ingress and egress of air or other gas is thus possible. In addition, ingress and egress of gas is possible, to a slight extent, upwardly through the whole bed of fines lying on the traveling pans. Considering the relatively large area of this bed of fines, ingress or egress of gas, if uncontrolled, might prove a serious difficulty and obstacle in the operation of the furnace. In applying the present invention to the apparatus of Fig. 2, I arrange the exhaust gas outlets 55 of the condensers 15 feet, or more, above the roof or arch 69 of the reducing chamber. By this arrangement I set up an available stack draft of about 0.15 inches of water. This stack draft, considering the relatively considerable opportunity for gas ingress and egress at the residue discharge opening of the reducing chamber as well as through the bed of fines, is more than ample to induce the flow of the gases evolved in the reducing chamber into the condensers, and, if uncontrolled, to suck or draw into the reducing chamber amounts of air harmful to good condensation of zinc vapor.

Accordingly, in the practice of the present invention in the apparatus of Fig. 2, I control the flow of gases induced by the stack draft so that there is just a pressure balance maintained in the reducing chamber against the outside atmosphere. This control is effected by appropriate manipulation of the valves 55 in the exhaust gas pipes 54 from the condensers. By this control I prevent either air from entering the reducing chamber or zinc laden gases from leaving the reducing chamber. In actual practice, the operator is instructed to hold the pressure in the hoods 53 of the condensers at predetermined intensities, which have been determined as appropriate to permit a very slight ingress of air at the residue discharge opening of the reducing chamber. Under these conditions there is a very slight and almost imperceptible tendency for air to flow upwardly through the bed of fines. This incoming air meets, near the top of the bed of fines, unburned zinc vapor which is immediately burned to zinc oxide, which latter effectively plugs or seals the bed of fines.

If desired, the entire bottom of the pan conveyors may be enclosed and an atmosphere of reducing gas, such as hydrogen, carbon monoxide, vaporized fuel oil, or the like, established in the enclosure beneath the pans. By now lowering the pressure in the hoods 53 of the condensers, by opening the valves 55, the reducing gases in the enclosure may be induced to flow upwardly through the bed of fines, as well as in at the residue discharge opening of the reducing chamber, to the extent desired.

In the operation of the apparatus of Fig. 2, I prefer, as hereinbefore mentioned, to provide pressure responsive devices and appropriate indicating and recording instruments for measuring the pressure in the gas outlets of the reducing chamber. By comparison of these pressures with the pressures in the hoods, stoppage or other faults in the flow of the evolved gases will be indicated.

From the foregoing description, it will be seen that my present invention, in one of its aspects, involves the utilization of pressure differentials, realized by locating the ultimate exhaust gas outlet at a level considerably above the residue discharge opening, for establishing at the residue discharge opening a gas pressure balance equivalent, so far as gas is concerned, to a mechanical or fines seal. Such a balanced gas pressure seal leaves the discharge opening entirely free and unencumbered so that various simple types of residue removing devices may be conveniently and advantageously employed. The balanced gas pressure seal is established and maintained by establishing and maintaining at the residue discharge opening of the reducing chamber substantially the same gas pressure within the chamber as exists without the chamber. This is accomplished by controlling the resistance to the escape of gases from the condensers, or other appropriate zinc vapor treatment device, towards which the gases generated within the reducing chamber are induced to flow by virtue of the lower absolute pressure existing at that point as a consequence of and in proportion to its elevation above the residue discharge opening.

If the volume of gases generated within the reducing chamber near the residue discharge opening be too great or the resistance to the flow of gases through the voids of the charge as a whole be too great, the differential between the absolute pressures at the condenser exhaust gas outlet and the residue discharge opening may be insufficient to induce the necessary flow of gas towards the condenser, and gas will then back out of the residue discharge opening and be lost. On the other hand, if the charge as a whole is very porous and the volume of gas generated near the residue discharge opening is small and the resistance to the exiting gases from the condenser is low, the pressure differential may be so great as to draw in relatively large quantities of air or other gas through the residue discharge opening. For gas sealing purposes, the ideal condition is to maintain this differential pressure under such control and adjustment that no gas flows out of or into the reducing chamber through the residue discharge opening. In actual commercial practice, however, it is impracticable to control this gas pressure balance so closely that absolutely no gas flows one way or the other. My preferred practice is to adjust the resistance of the condenser exhaust gas outlet very accurately to the volume of gases being generated, and whatever tolerance is permitted is in favor of a slightly lower resistance rather than too high a resistance. This means that some air may be admitted into the reducing chamber through the residue discharge opening, but controlled amounts of air are not harmful to metal condensation when admitted at the residue discharge opening, whereas if too great a resistance is established at the condenser exhaust gas outlet, zinc-carrying gases will back out of the residue discharge opening and be lost.

In addition to providing a balanced gas pressure seal for the residue discharge opening, the invention permits the controlled ingress into the reducing chambers of air or reducing gases in amounts beneficial to the reducing operation, as has been hereinbefore described.

One of the particular advantages of the present invention is that it enables the discharge of a dry gas-porous residue, when making zinc metal, zinc oxide or zinc dust. This is the type of residue that is most suitable to the rapid transfer of heat to all parts of the porous charge by means of currents of heat-carrying gases. And the invention, by enabling the discharge of a dry residue, makes it possible to use simple types of residue discharge devices. Moreover, since the residue discharge opening is open and unsealed, inspection of the discharging residues is facilitated, thereby materially assisting in the routine operating control by foreman and furnacemen of the process to insure a residue of proper physical condition and well worked-off.

I claim:—

1. The improvement in the method of reducing a porous charge of zinciferous and reducing materials and recovering zinc metal in an externally heated reducing chamber operatively connected with a condenser and having a residue discharge outlet permitting ingress and egress of gas, which comprises inducing the flow of evolved gases into the condenser by controlled stack draft and thereby substantially inhibiting the ingress and egress of gas through said discharge outlet.

2. The improvement in the method of reducing a porous charge of zinciferous and carbonaceous materials and recovering zinc metal in an externally heated reducing chamber operatively connected with a condenser and having in addition to its communication with the condenser at least one opening permitting gas ingress or egress, which comprises inducing the flow of evolved gases into the condenser by controlled stack draft and thereby regulating to a desired extent the ingress of gas through said opening into the reducing chamber.

3. The improvement in the method of reducing zinciferous material in a reducing chamber operatively connected with a condenser and having a residue discharge opening positioned at a sufficient distance below the exhaust gas outlet of the condenser to set up a stack draft capable of inducing the flow towards the condenser of all the gases generated in the reducing chamber, which comprises controlling the gas flow induced by the stack draft so as to establish and maintain a condition of regulated gas pressures within the reducing chamber at its residue discharge opening.

4. The improvement in the method of reducing zinciferous material in an externally heated reducing chamber operatively connected with a condenser and having a residue discharge opening positioned at a sufficient distance below the exhaust gas outlet of the condenser to set up a stack draft capable of inducing the flow towards the condenser of all the gases generated in the reducing chamber, which comprises controlling the gas flow induced by the stack draft so as to permit the ingress into the reducing chamber through its residue discharge opening of regulated amounts of a reduction promoting gas.

5. The improvement in the method of reducing zinciferous material in an externally heated reducing chamber operatively connected with a condenser and having a residue discharge opening positioned at a sufficient distance below the exhaust gas outlet of the condenser to set up a stack draft capable of inducing the flow towards the condenser of all the gases generated in the reducing chamber, which comprises regulating the resistance to the discharge of exhaust gases from the condenser and thereby controlling the gas flow induced by the stack draft.

6. The method of reducing zinciferous material, which comprises progressively passing a porous charge of zinciferous and reducing materials through an externally heated upright retort having a residue discharge opening positioned at a sufficient distance below the exhaust gas outlet of the retort to set up a stack draft capable of inducing the flow towards the condenser of all the gases generated in the retort, and controlling the gas flow induced by the stack draft so as to establish and maintain a condition of regulated gas pressures within the retort at its residue discharge opening.

7. The improvement in the method of reducing a porous charge of zinciferous and reducing materials in an externally heated upright retort operatively connected with a condenser and having an unsealed residue discharge opening positioned at a sufficient distance below the exhaust gas outlet of the condenser to set up a stack draft capable of inducing the flow towards the condenser of all the gases generated in the retort, which comprises controlling the gas flow induced by the stack draft so as to establish and maintain a condition of regulated gas pressures within the retort at its residue discharge opening.

8. The improvement in the method of reducing a porous charge of zinciferous and reducing materials in an externally heated upright retort operatively connected with a condenser and having a residue discharge opening positioned at a sufficient distance below the exhaust gas outlet of the condenser to set up a stack draft capable of inducing the flow towards the condenser of all the gases generated in the retort, which comprises controlling the gas flow induced by the stack draft so as to permit the ingress into the retort through its residue discharge opening of regulated amounts of a reduction promoting gas.

9. The method of reducing an agglomerated charge of mixed zinciferous material and carbonaceous reducing agent in a reduction chamber having an unsealed residue discharge opening located at a sufficient distance below the exhaust gas and vapor outlet associated with the reduction chamber to set up a stack draft capable of inducing the flow from the reduction chamber of all the gases and vapor generated in the reduction chamber, which comprises regulating the gas flow induced by the stack draft so as to establish and maintain a condition of predetermined and controlled gas pressures within the reduction chamber at its residue discharge opening.

In testimony whereof I affix my signature.

FRANK G. BREYER.